United States Patent
Dwarakanath et al.

(10) Patent No.: US 7,876,080 B2
(45) Date of Patent: Jan. 25, 2011

(54) POWER CONVERTER WITH MONOTONIC TURN-ON FOR PRE-CHARGED OUTPUT CAPACITOR

(75) Inventors: Mirmira Ramarao Dwarakanath, Warren, NJ (US); Jue Wang, Hillsborough, NJ (US)

(73) Assignee: Enpirion, Inc., Hampton, NJ (US)

( * ) Notice: Subject to any disclaimer, the term of this patent is extended or adjusted under 35 U.S.C. 154(b) by 446 days.

(21) Appl. No.: 11/965,618

(22) Filed: Dec. 27, 2007

(65) Prior Publication Data
US 2009/0167267 A1 Jul. 2, 2009

(51) Int. Cl.
*G05F 1/56* (2006.01)

(52) U.S. Cl. .................. 323/284; 323/285; 323/299; 323/901

(58) Field of Classification Search ............ 323/282, 323/284, 285, 299, 901
See application file for complete search history.

(56) References Cited

U.S. PATENT DOCUMENTS

| | | | |
|---|---|---|---|
| 4,016,461 A * | 4/1977 | Roland ............... | 361/18 |
| 4,654,770 A | 3/1987 | Santurtûn et al. | |
| 4,761,725 A | 8/1988 | Henze | |
| 4,801,816 A | 1/1989 | Merlo et al. | |
| 4,912,622 A | 3/1990 | Steigerwald et al. | |
| 4,982,353 A | 1/1991 | Jacob et al. | |
| 5,245,228 A | 9/1993 | Harter | |
| 5,258,662 A | 11/1993 | Skovmand | |
| 5,285,369 A | 2/1994 | Balakrishnan | |
| 5,371,415 A | 12/1994 | Dixon et al. | |
| 5,414,341 A | 5/1995 | Brown | |
| 5,469,334 A | 11/1995 | Balakrishnan | |
| 5,510,739 A | 4/1996 | Caravella et al. | |
| 5,541,541 A | 7/1996 | Salamina et al. | |
| 5,568,044 A | 10/1996 | Bittner | |
| 5,592,072 A | 1/1997 | Brown | |
| 5,594,324 A | 1/1997 | Canter et al. | |
| 5,625,312 A | 4/1997 | Kawakami et al. | |
| 5,689,213 A | 11/1997 | Sher | |
| 5,796,276 A | 8/1998 | Phillips et al. | |
| 5,864,225 A | 1/1999 | Bryson | |
| 5,877,611 A | 3/1999 | Brkovic | |

(Continued)

OTHER PUBLICATIONS

Barrado, A., et al., "New DC/DC Converter with Low Output Voltage and Fast Transient Response," Proceedings of the IEEE Applied Power Electronics Conference, 2003, pp. 432-437, IEEE, Los Alamitos, CA.

(Continued)

*Primary Examiner*—Jeffrey L Sterrett
(74) *Attorney, Agent, or Firm*—Slater & Matsil, L.L.P.

(57) ABSTRACT

A power converter for and method of producing a monotonic rise in output voltage at start-up. In one embodiment, the power converter includes a switch and an error amplifier coupled to an output terminal of the power converter. The power converter also includes a comparator with an output terminal coupled to a control terminal of the switch and an input terminal coupled to an output terminal of the error amplifier configured to enable the switch to conduct for a duty cycle. Additionally, the switch is configured to be turned off at a start-up of the power converter until a voltage of the output terminal of the error amplifier provides a duty cycle for the switch corresponding to an output characteristic pre-charge condition.

20 Claims, 3 Drawing Sheets

U.S. PATENT DOCUMENTS

| | | | |
|---|---|---|---|
| 5,912,589 | A | 6/1999 | Khoury et al. |
| 5,977,811 | A | 11/1999 | Magazzú |
| 6,005,377 | A | 12/1999 | Chen et al. |
| 6,118,351 | A | 9/2000 | Kossives et al. |
| 6,169,433 | B1 | 1/2001 | Farrenkopf |
| 6,201,429 | B1 | 3/2001 | Rosenthal |
| 6,211,706 | B1 | 4/2001 | Choi et al. |
| 6,222,403 | B1 | 4/2001 | Mitsuda |
| 6,255,714 | B1 | 7/2001 | Kossives et al. |
| 6,262,564 | B1 | 7/2001 | Kanamori |
| 6,285,209 | B1 | 9/2001 | Sawai |
| 6,285,539 | B1 | 9/2001 | Kashimoto et al. |
| 6,320,449 | B1 | 11/2001 | Capici et al. |
| 6,388,468 | B1 | 5/2002 | Li |
| 6,407,579 | B1 | 6/2002 | Goswick |
| 6,407,594 | B1 | 6/2002 | Milazzo et al. |
| 6,477,065 | B2 | 11/2002 | Parks |
| 6,495,019 | B1 | 12/2002 | Filas et al. |
| 6,541,819 | B2 | 4/2003 | Lotfi et al. |
| 6,570,413 | B1 | 5/2003 | Kumagai et al. |
| 6,573,694 | B2 | 6/2003 | Pulkin et al. |
| 6,580,258 | B2 | 6/2003 | Wilcox et al. |
| 6,639,427 | B2 | 10/2003 | Dray et al. |
| 6,650,169 | B2 | 11/2003 | Faye et al. |
| 6,661,216 | B1 * | 12/2003 | Grant et al. ............ 323/282 |
| 6,759,836 | B1 * | 7/2004 | Black, Jr. ............. 323/288 |
| 6,791,305 | B2 | 9/2004 | Imai et al. |
| 6,822,882 | B1 | 11/2004 | Jacobs et al. |
| 6,828,825 | B2 | 12/2004 | Johnson et al. |
| 6,879,137 | B2 | 4/2005 | Sase et al. |
| 6,922,044 | B2 | 7/2005 | Walters et al. |
| 7,015,544 | B2 | 3/2006 | Lotfi et al. |
| 7,019,505 | B2 | 3/2006 | Dwarakanath et al. |
| 7,038,438 | B2 | 5/2006 | Dwarakanath et al. |
| 7,038,514 | B2 | 5/2006 | Leith et al. |
| 7,061,217 | B2 | 6/2006 | Bayer et al. |
| 7,148,670 | B2 | 12/2006 | Inn et al. |
| 7,190,150 | B2 | 3/2007 | Chen et al. |
| 7,214,985 | B2 | 5/2007 | Lotfi et al. |
| 7,230,302 | B2 | 6/2007 | Lotfi et al. |
| 7,319,311 | B2 | 1/2008 | Nishida |
| 7,330,017 | B2 | 2/2008 | Dwarakanath et al. |
| 7,352,162 | B1 * | 4/2008 | Chang et al. ........... 323/290 |
| 7,482,795 | B2 * | 1/2009 | Parto et al. ............ 323/284 |
| 7,482,796 | B2 * | 1/2009 | Nishida ............... 323/284 |
| 7,501,805 | B2 * | 3/2009 | Chen et al. ............ 323/282 |
| 7,521,907 | B2 | 4/2009 | Cervera et al. |
| 7,710,093 | B2 | 5/2010 | Dwarakanath et al. |
| 7,733,072 | B2 * | 6/2010 | Kanakubo ............. 323/271 |
| 2002/0175661 | A1 | 11/2002 | Wheeler et al. |
| 2004/0169498 | A1 | 9/2004 | Goder et al. |
| 2005/0046405 | A1 | 3/2005 | Trafton et al. |
| 2005/0088216 | A1 | 4/2005 | Arndt et al. |
| 2005/0167756 | A1 | 8/2005 | Lotfi et al. |
| 2005/0168203 | A1 | 8/2005 | Dwarakanath et al. |
| 2005/0168205 | A1 | 8/2005 | Dwarakanath et al. |
| 2005/0169024 | A1 | 8/2005 | Dwarakanath et al. |
| 2006/0038225 | A1 | 2/2006 | Lotfi et al. |
| 2006/0132217 | A1 | 6/2006 | Lou et al. |
| 2007/0210777 | A1 | 9/2007 | Cervera et al. |
| 2008/0018366 | A1 | 1/2008 | Hanna |
| 2008/0094114 | A1 | 4/2008 | Dwarakanath et al. |
| 2008/0106246 | A1 | 5/2008 | Dwarakanath et al. |

OTHER PUBLICATIONS

Betancourt-Zamora, R.J. et al., "A 1.5 mW, 200 MHz CMOS VCO for Wireless Biotelemetry," First International Workshop on Design of Mixed-Mode Integrated Circuits and Applications, Jul. 1997, pp. 72-74, Cancun, Mexico.

Goder, D., et al., "V2 Architecture Provides Ultra-Fast Transient Response in Switch Mode Power Supplies," Proceedings of HFPC Power Conversion, 1996, pp. 414-420.

Goodman, J. et al., "An Energy/Security Scalable Encryption Processor Using an Embedded Variable Voltage DC/DC Converter," IEEE Journal of Solid-State Circuits, Nov. 1998, vol. 33, No. 11, IEEE, Los Alamitos, CA.

Horowitz, P., et al., "The Art of Electronics," Second Edition, 1989, pp. 288-291, Cambridge University Press, Cambridge, MA.

"Linear Technology: LTC3736-1: Dual 2-Phase, No RSENSETM, Synchronous Controller with Spread Spectrum," 2004, 28 pp., Linear Technology Corporation, Milpitas, CA.

Lotfi, A.W., et al., "Issues and Advances in High-Frequency Magnetics for Switching Power Supplies," Proceedings of the IEEE, Jun. 2001, vol. 89, No. 6, pp. 833-845, IEEE, Los Alamitos, CA.

Patella, B.J., et al., "High-Frequency Digital Controller IC for DC/DC Converters," IEEE Proceedings of the Applied Power Electronics Conference, Mar. 10, 2002, 7 pp., IEEE, Los Alamitos, CA.

Peterchev, A.V., et al., "Quantization Resolution and Limit Cycling in Digitally Controlled PWM Converters," IEEE Transactions on Power Electronics, Jan. 2003, pp. 301-303, vol. 18, No. 1, IEEE, Los Alamitos, CA.

Redl, R., et al., "Optimizing the Load Transient Response of the Buck Converter," Proceedings of the IEEE Applied Power Electronics Conference, 1998, pp. 170-176, IEEE, Los Alamitos, CA.

Schoneman, G.K., et al., "Output Impedance Considerations for Switching Regulators with Current-Injected Control," Proceedings of the 18th Annual IEEE Power Electronics Specialists Conference, Jun. 1987, pp. 324-335, IEEE, Los Alamitos, CA.

Soto, A., et al., "Analysis of the Buck Converter for Scaling the Supply Voltage of Digital Circuits," Proceedings of the IEEE Applied Power Electronics Conference, 2003, pp. 711-717, IEEE, Los Alamitos, CA.

Soto, A., et al., "Design Methodology for Dynamic Voltage Scaling in the Buck Converter," Proceedings of the IEEE Applied Power Electronics Conference, 2005, pp. 263-269, IEEE, Los Alamitos, CA.

"TPS40100: Midrange Input Synchronous Buck Controller with Advanced Sequencing and Output Margining," May 2005, 37 pp., Texes Instruments Incorporated, Dallas, TX.

Zhou, X., et al., "Improved Light-Load Efficiency for Synchronous Rectifier Voltage Regulation Module," IEEE Transactions on Power Electronics, Sep. 2000, pp. 826-834, vol. 15, No. 5, IEEE, Los Alamitos, CA.

* cited by examiner

POWER CONVERTER WITH MONOTONIC TURN-ON FOR PRE-CHARGED OUTPUT CAPACITOR

TECHNICAL FIELD

The present invention is directed, in general, to power electronics and, more specifically, to a controller for a power converter, method of controlling a switch therein, and a power converter employing the same.

BACKGROUND

A switch-mode power converter (also referred to as a "power converter" or "regulator") is a power supply or power processing circuit that converts an input voltage waveform into a specified output voltage waveform. DC-DC power converters convert a dc input voltage into a dc output voltage. Controllers associated with the power converters manage an operation thereof by controlling the conduction periods of switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter and based thereon modifies a duty cycle of the switches of the power converter. The duty cycle is a ratio represented by a conduction period of a switch to a switching period thereof. Thus, if a switch conducts for half of the switching period, the duty cycle for the switch would be 0.5 (or 50 percent). Additionally, as the needs for systems, such as a microprocessor powered by the power converter, dynamically change (e.g., as a computational load on the microprocessor changes), the controller should be configured to dynamically increase or decrease the duty cycle of the switches therein to maintain an output characteristic such as an output voltage at a desired value.

In an exemplary application, the power converters have the capability to convert an unregulated input voltage, such as five volts, supplied by an input voltage source to a lower, regulated, output voltage, such as 2.5 volts, to power a load. To provide the voltage conversion and regulation functions, the power converters include active switches such as metal-oxide semiconductor field-effect transistors ("MOSFETs") that are coupled to the voltage source and periodically switch a reactive circuit element such as an inductor to the voltage source at a switching frequency that may be on the order of five megahertz.

In some applications of dc-dc power converters, before the power converter is initially turned on, an output capacitor is pre-charged by an external circuit. A requirement in this type of application is that the dc-dc power converter should not drain the output capacitor prior to or at turn-on. Ideally, the output voltage should increase monotonically from the pre-charge voltage value to the final target output voltage. However, this can be a problem for dc-dc power converters employing a synchronous rectifier, especially when the power converter has a soft-start feature. Capacitor draining can potentially occur when a synchronous rectifier switch is enabled to conduct. During soft start, a reference voltage, typically employed to regulate an output voltage of the power converter, starts from 0 volts and ramps up to a final target voltage. Since the output voltage substantially follows the ramping reference voltage, the output capacitor will initially be discharged to substantially zero volts by the synchronous rectifier.

Several approaches have been used to address the problem of power converter start-up with a pre-charged output capacitor and synchronous rectifiers. One approach generally referred to as "diode emulation," such as used in the Intersil™ Synchronous Rectifier MOSFET Driver ISL6608, senses the current in a low-side synchronous rectifier. If current is detected flowing through the synchronous rectifier from the output capacitor to ground, the synchronous rectifier is disabled. Alternatively, current in the output inductor can be sensed. When the current in the output inductor reaches zero, a low-side switch (i.e., synchronous rectifier switch) is turned off, which prevents the output inductor from sinking current. Nonetheless, either approach requires a relatively accurate current-sensing scheme with a fast response. Such circuits are hard to realize, particularly when using multi-megahertz ("MHz") switching frequencies.

A second approach, such as described in U.S. Patent Application Publication No. 2004/0169498, entitled "Apparatus for and Method of Adjusting a Switching Regulator Output for a Circuit having a Pre-Charge Voltage," published Sep. 2, 2004, which is incorporated herein by reference, compares the reference voltage (which controls the output voltage of the power converter) with the output capacitor pre-charge voltage. If the reference voltage is smaller than the pre-charge voltage across the output capacitor, both the main switch and the synchronous rectifier switch are turned off. When the reference voltage ramps up to the pre-charge voltage, a pulse-width modulation ("PWM") control circuit is enabled. This approach is readily usable with a digital controller. When using analog controllers, however, there is a delay between enabling the controller and the output of an error amplifier reaching the correct voltage. Switching from a high-impedance mode to PWM mode is therefore not smooth, resulting in a transient in the output voltage.

A third approach, such as described in U.S. Pat. No. 7,038,514, entitled "Start-up Circuit for a DC-DC Converter," issued May 2, 2006, which is incorporated herein by reference, compares an error amplifier output voltage with a preset reference voltage, which is set approximately at the middle voltage of a sawtooth voltage waveform coupled to a comparator that controls the switches of the power converter. In this approach, when the power converter is initially powered on, the error amplifier output is initially low and the switches are off. Once the error amplifier output exceeds the predetermined threshold, the power converter switching action is turned on. Since the threshold is not adjusted for changes in power converter input and output voltages, the controller duty cycle is often not properly matched and, therefore, does not ensure a monotonic ramp of the output waveform.

A fourth approach, such as used in the TPS54673 high-frequency power converter manufactured by Texas Instruments, disables reverse conduction in a synchronous rectifier switch during start-up. Synchronous rectifier switches are turned on only when an error amplifier output saturates at its maximum value. This approach initially turns on the main switch, and eventually both the main switch and the synchronous rectifier switch are switched on. This approach has the same disadvantage as the third approach described above.

Accordingly, what is needed in the art is a process and related method to monotonically increase the output voltage of a PWM-controlled power converter, particularly for a power converter employing synchronous rectifiers, from a pre-charge voltage across an output capacitor to a final target output voltage, that overcomes deficiencies in the prior art.

SUMMARY OF THE INVENTION

These and other problems are generally solved or circumvented, and technical advantages are generally achieved, by advantageous embodiments of the present invention, including a power converter for and method of producing a monotonic rise in output voltage at start-up. In one embodiment, the power converter includes a switch and an error amplifier coupled to an output terminal of the power converter. The power converter also includes a comparator with an output terminal coupled to a control terminal of the switch and an input terminal coupled to an output terminal of the error amplifier configured to enable the switch to conduct for a duty cycle. Additionally, the switch is configured to be turned off at a start-up of the power converter until a voltage of the output terminal of the error amplifier provides a duty cycle for the switch corresponding to an output characteristic pre-charge condition.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to clearly illustrate the relevant aspects of exemplary embodiments.

DETAILED DESCRIPTION OF ILLUSTRATIVE EMBODIMENTS

The making and using of the presently exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power converter including a controller responsive to a precharge voltage of an output capacitor and methods of forming the same. While the principles of the present invention will be described in the environment of a power converter, any application that may benefit from a power converter, such as a power amplifier, including a controller responsive to a precharge voltage of an output capacitor is well within the broad scope of the present invention.

Figure 1:
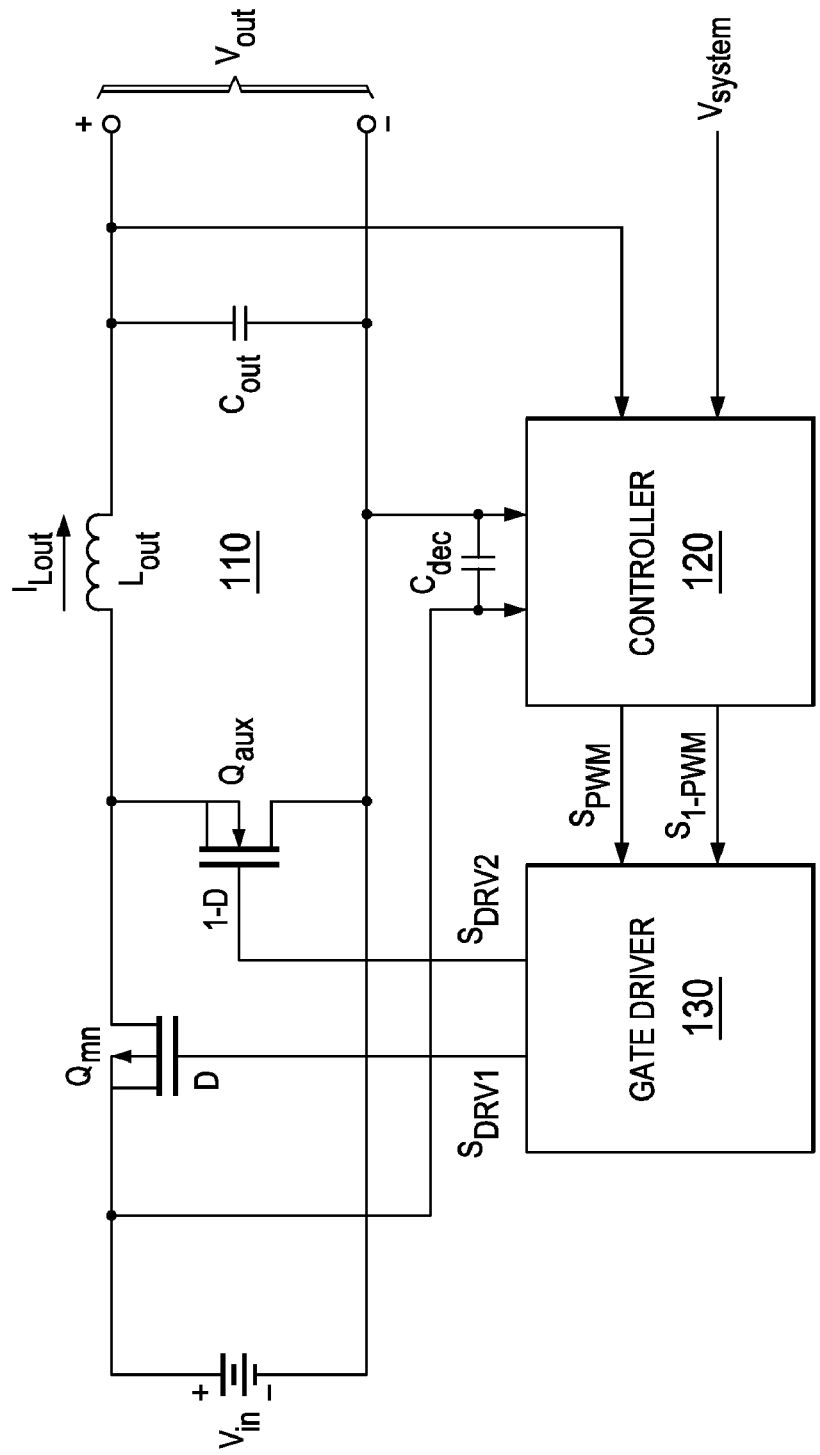
FIG. 1 illustrates a diagram of an embodiment of a power converter including a controller constructed according to the principles of the present invention.

Referring initially to FIG. 1, illustrated is a diagram of an embodiment of a power converter including a controller responsive to a precharge voltage of an output capacitor constructed according to the principles of the present invention. The controller may advantageously monotonically increase the output voltage of the power converter at converter start-up when an initial precharge voltage has been applied to an output capacitor thereof. The power converter includes a power train 110, a controller 120, and a driver 130, and provides power to a system/load such as a microprocessor (not shown) coupled to output terminals. While in the illustrated embodiment the power train 110 employs a buck converter topology, those skilled in the art should understand that other converter topologies such as a forward converter topology are well within the broad scope of the present invention.

The power train 110 of the power converter receives an input voltage $V_{in}$ from a source of electrical power (represented by a battery) at an input thereof and provides a regulated output voltage $V_{out}$, or other output characteristic. In keeping with the principles of a buck converter topology, the output voltage $V_{out}$ is generally less than the input voltage $V_{in}$ such that a switching operation of the power converter can regulate the output voltage $V_{out}$. A main switch $Q_{mn}$ [e.g., a p-channel metal oxide semiconductor field effect transistor ("MOSFET") embodied in a p-type laterally diffused metal oxide semiconductor ("P-LDMOS") device], is enabled to conduct for a primary interval (generally co-existent with a primary duty cycle "D" of the main switch $Q_{mn}$) and couples the input voltage $V_{in}$ to an output filter inductor $L_{out}$. During the primary interval, an inductor current $I_{Lout}$ flowing through the output filter inductor $L_{out}$ increases as a current flows from the input to the output of the power train 110. An ac component of the inductor current $I_{Lout}$ is filtered by the output capacitor $C_{out}$.

During a complementary interval (generally co-existent with a complementary duty cycle "1-D" of the main switch $Q_{mn}$), the main switch $Q_{mn}$ is transitioned to a non-conducting state and an auxiliary switch $Q_{aux}$ [e.g., an n-channel MOSFET embodied in an n-type laterally diffused metal oxide semiconductor ("N-LDMOS") device], coupled to the reactive circuit element $L_{out}$, is enabled to conduct. The auxiliary switch $Q_{aux}$ provides a path to maintain a continuity of the inductor current $I_{Lout}$ flowing through the output filter inductor $L_{out}$. During the complementary interval, the inductor current $I_{Lout}$ flowing through the output filter inductor Lout decreases. In general, the duty cycle of the main and auxiliary switches $Q_{mn}$, $Q_{aux}$ may be adjusted to maintain a regulation of the output voltage $V_{out}$ of the power converter. Those skilled in the art should understand, however, that the conduction periods for the main and auxiliary switches $Q_{mn}$, $Q_{aux}$ may be separated by a small time interval to avoid cross conduction therebetween and beneficially to reduce the switching losses associated with the power converter.

The controller 120 of the power converter receives a desired output characteristic such as a desired system voltage $V_{system}$ from an internal or external source associated with the load, and the output voltage $V_{out}$ of the power converter. The controller 120 may also be coupled to the input voltage $V_{in}$ of the power converter and a return lead of the source of electrical power (again, represented by a battery) as illustrated in the FIGURE to provide a ground connection therefor. While only a single ground connection is illustrated in the present embodiment, those skilled in the art should understand that multiple ground connections may be employed for use within the controller 120. A decoupling capacitor $C_{dec}$ may be coupled as illustrated in the figure to the path from the input voltage $V_{in}$ to the controller 120. The decoupling capacitor $C_{dec}$ is generally configured to absorb high frequency noise signals associated with the source of electrical power to protect the controller 120.

In accordance with the aforementioned characteristics, the controller 120 during ordinary operational pulse-width modulation ("PWM") control provides a signal (e.g., a pulse-width modulated signal $S_{PWM}$) to control a duty cycle and a frequency of the main and auxiliary switches $Q_{mn}$, $Q_{aux}$ of the power train 110 to regulate the output voltage $V_{out}$ or other output characteristic thereof. The controller 120 may also in some applications provide a complement of the signal (e.g., a complementary pulse-width modulated signal $S_{1-PWM}$) in accordance with the aforementioned characteristics. Any controller adapted to control at least one switch of the power converter is well within the broad scope of the present invention. As an example, a controller employing digital circuitry is disclosed in U.S. Pat. No. 7,038,438, entitled "Controller for a Power Converter and a Method of Controlling a Switch Thereof," to Dwarakanath, et al., issued, May 2, 2006, and U.S. Pat. No. 7,019,505, entitled "Digital Controller for a Power Converter Employing Selectable Phases of a Clock Signal," issued, Mar. 28, 2006, which are incorporated herein by reference.

The power converter also includes driver 130 to provide gate drive signals D and 1-D to control conductivity of the main and auxiliary switches $Q_{mn}$, $Q_{aux}$, respectively, responsive to the PWM control signal $S_{PWM}$ (and, if necessary, the control signal $S_{1-PWM}$) provided by the controller 120. There are a number of viable alternatives to implement a driver 130 that include techniques to provide sufficient signal delays to prevent crosscurrents when controlling multiple switches in the power converter. The driver 130 typically includes switching circuitry incorporating a plurality of driver switches that cooperate to provide the drive signals D and 1-D to the main and auxiliary switches $Q_{mn}$, $Q_{aux}$. Of course, any driver 130 capable of providing the drive signals D and 1-D to control a switch is well within the broad scope of the present invention. As an example, a driver is disclosed in U.S. Patent Application Publication No. 2005/0168203, entitled "Driver for a Power Converter and a Method of Driving a Switch Thereof," published Aug. 4, 2005 and a switch is disclosed in U.S. Pat. No. 7,230,302, entitled "Laterally Diffused Metal Oxide Semiconductor Device and Method of Forming the Same," issued Jun. 12, 2007 and U.S. Pat. No. 7,214,985, entitled "Integrated Circuit Incorporating Higher Voltage Devices and Low Voltage Devices Therein," issued May 8, 2007, which are incorporated herein by reference.

According to the principles of the present invention, the main and auxiliary switches $Q_{mn}$, $Q_{aux}$ are typically power switches that can be incorporated into a semiconductor device in an integrated circuit proximate control or signal processing devices that perform many of the control functions of the controller 120 of the power converter. The control and signal processing devices are typically CMOS devices such as p-type metal oxide semiconductor ("PMOS") devices and n-type metal oxide semiconductor ("NMOS") devices. The PMOS and NMOS devices may also be referred to as p-channel and n-channel MOSFETs, respectively.

In a switch-mode power converter, such as the buck power converter illustrated and described with reference to FIG. 1, the duty cycle of a switch, such as the main switch $Q_{mn}$ previously described herein, determines the steady-state ratio of a power converter output voltage $V_{out}$ to its input voltage $V_{in}$. In particular, for a buck power converter typology operating in a continuous conduction mode, duty cycle determines the ratio of output voltage to input voltage according to the equation:

$$D=V_{out}/V_{in}. \qquad (1)$$

In an alternative power converter typology, such as a boost topology, duty cycle determines the ratio of output to input voltage operating in a continuous conduction mode ("CCM") according to the equation:

$$D=V_{in}/V_{out}. \qquad (2)$$

This reciprocal relationship for the ratio of input and output voltages of buck and boost topologies recognizes that a buck power converter topology employing synchronous rectifiers is operable as a boost topology with its input and output reversed, and vice versa. Other switch-mode power converter topologies such as a buck-boost, forward, Cúk, etc., are characterized by further relationships, well known in the art, for a ratio of output voltage to input voltage, for a particular operating condition such as CCM.

A controller, such as controller 120 illustrated in FIG. 1, typically regulates an output characteristic of a power converter by controlling a duty cycle of a switch. Duty cycle is generally controlled by comparing a sawtooth voltage waveform with a controlled threshold voltage produced by an error amplifier configured to sense an output voltage or other output characteristic. For example, as described hereinbelow with reference to FIG. 3, an error amplifier input terminal may be coupled to a power converter output terminal.

Figure 2:
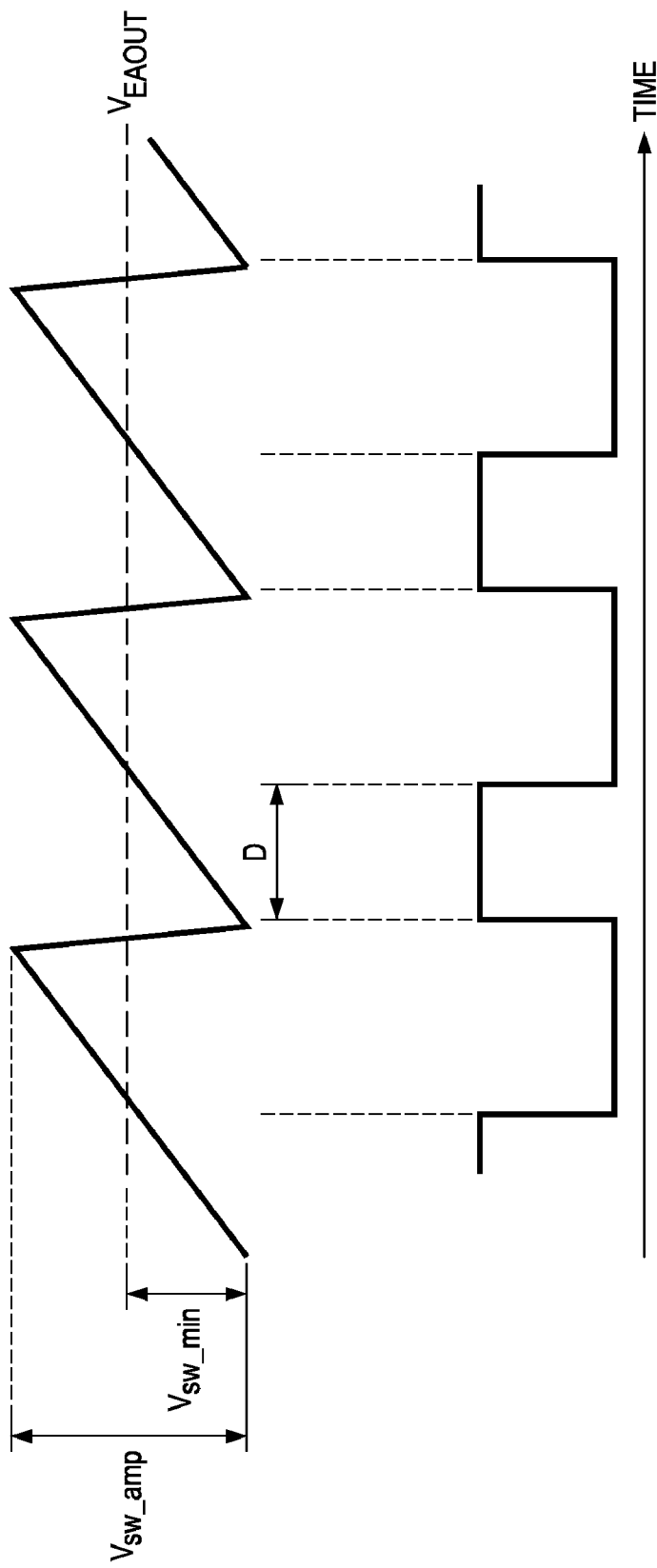
FIG. 2 illustrates a graphical representation showing the geometrical relationship between duty cycle, the amplitude of a sawtooth voltage waveform and the output voltage of an error amplifier of a power converter.

Referring to FIG. 2, illustrated is a graphical representation showing the geometrical relationship between duty cycle, the amplitude of a sawtooth voltage waveform and the output voltage of an error amplifier of a power converter. The duty cycle "D" can be related (in a steady state operating condition) to the error amplifier output voltage, the sawtooth waveform valley voltage, and the sawtooth waveform peak-to-peak voltage amplitude such as by the equation:

$$D=(V_{EAOUT}-V_{sw\_min})/V_{sw\_amp}, \qquad (3)$$

where $V_{EAOUT}$ is the error amplifier output voltage, $V_{sw\_min}$ is the sawtooth waveform valley voltage, and $V_{sw\_amp}$ is the sawtooth waveform voltage amplitude.

In a normal PWM operational mode, assuming for simplicity and without limitation, no load and minimal losses, the relationship between an error amplifier output voltage and an output voltage for a particular power converter topology can be determined, such as by equation (4), $$V_{out}=V_{in}*(V_{EAOUT}-V_{sw\_min})V_{sw\_amp}, \qquad (4)$$

representing a buck topology operating in CCM. Other relationships corresponding to equation (4) above can be readily developed for other topologies and operating conditions.

Thus, an output characteristic of a power converter, such as an output voltage, can be related to the output voltage of an error amplifier and to characteristics of a sawtooth voltage waveform coupled to a comparator that generates a control signal for a switch. The error amplifier output voltage corresponding to a particular output voltage of a switch-mode power converter can be readily determined for a particular switch-mode topology and operating condition, such as by the equations above.

If a buck switching regulator operating in CCM is turned on when the error amplifier output voltage s equal to or just exceeds the error amplifier output voltage providing a threshold voltage $V_{EAOUT\_Th}$ for a comparator, $$V_{EAOUT\_Th} = (V_{prebias}/V_{in}) \cdot (V_{sw\_amp}) + V_{sw\_min}, \qquad (5)$$

where $V_{prebias}$ is a pre-bias output voltage or other characteristic of a power converter, then the corresponding output voltage of the error amplifier will be a good match to the pre-charge voltage across the power converter output capacitor. By enabling the switching action of the switches at this point, the system advantageously can change smoothly from an initial state wherein neither switch is enabled to conduct to a normal PWM operational mode with both switches alternately conducting without a mismatch in the required duty cycle, and with insubstantial overshoot/undershoot in the output voltage.

In a power converter including a controller constructed according to the principles of the invention, if a pre-charge voltage is present across power converter output terminals (e.g., at start-up), the power converter switching action is initially disabled (i.e., neither switch is enabled to conduct). A start-up condition for a power converter includes a re-start condition as well as resumption of power converter operation after an interruption, such as caused by, for example, and without limitation, an over-current or over-voltage condition. A reference voltage coupled to an error amplifier representing a desired system voltage gradually ramps up, and at some point exceeds the pre-charge power converter output voltage (or other power converter output characteristic) that may be scaled by a voltage divider and is fed back to the controller. The output voltage of the error amplifier in the controller then starts to increase, typically from zero volts, when the ramping reference voltage exceeds the fed back power converter output voltage. When the error amplifier output voltage equals the voltage necessary to produce a duty cycle corresponding to an output voltage pre-charge level, such as determined, without limitation, by using the equations described above, the switching action of the power converter is turned on. Accordingly, a switch is periodically enabled to conduct for a duty cycle that is adaptively determined from an error amplifier output voltage level based on an output voltage precharge condition, such as a pre-charge voltage across an output capacitor, thereby advantageously avoiding an unnecessary transient in the output voltage (or other output characteristic), such as unnecessary non-monotonicity in a change in output voltage.

The equation above for the error amplifier threshold voltage can be approximated with the linear expression:

$$V_{EAOUT\_Th} = V_{sw\_min} + A1 + A2 \cdot Vin + A3 \cdot V_{prebias}, \qquad (6)$$

where A1, A2, and A3 are constants for the approximation. In one implementation, the error generated by this equation was found to be less than 20 millivolts ("mV") at the output of the power converter for all possible input and prebias voltages within the overall specifications of the power converter. This error is comparable to the normal ripple present in such power converters.

In another approximation for the error amplifier threshold voltage, the input voltage range is divided into several subranges using an analog-to-digital converter. In each subrange the following equation is used to approximate the threshold voltage $V_{EAOUT\_Th}$:

$$V_{EAOUT\_Th} = V_{sw\_min} + B \cdot V_{prebias} \qquad (7)$$

where B is a constant for the approximation. Corresponding approximations can be used for other power converter topologies and operating conditions. Both approximations provide monotonic output voltage turn-on with a pre-charged output that is pre-charged to an unknown output voltage. The circuit implementation is simple and reliable.

Figure 3:
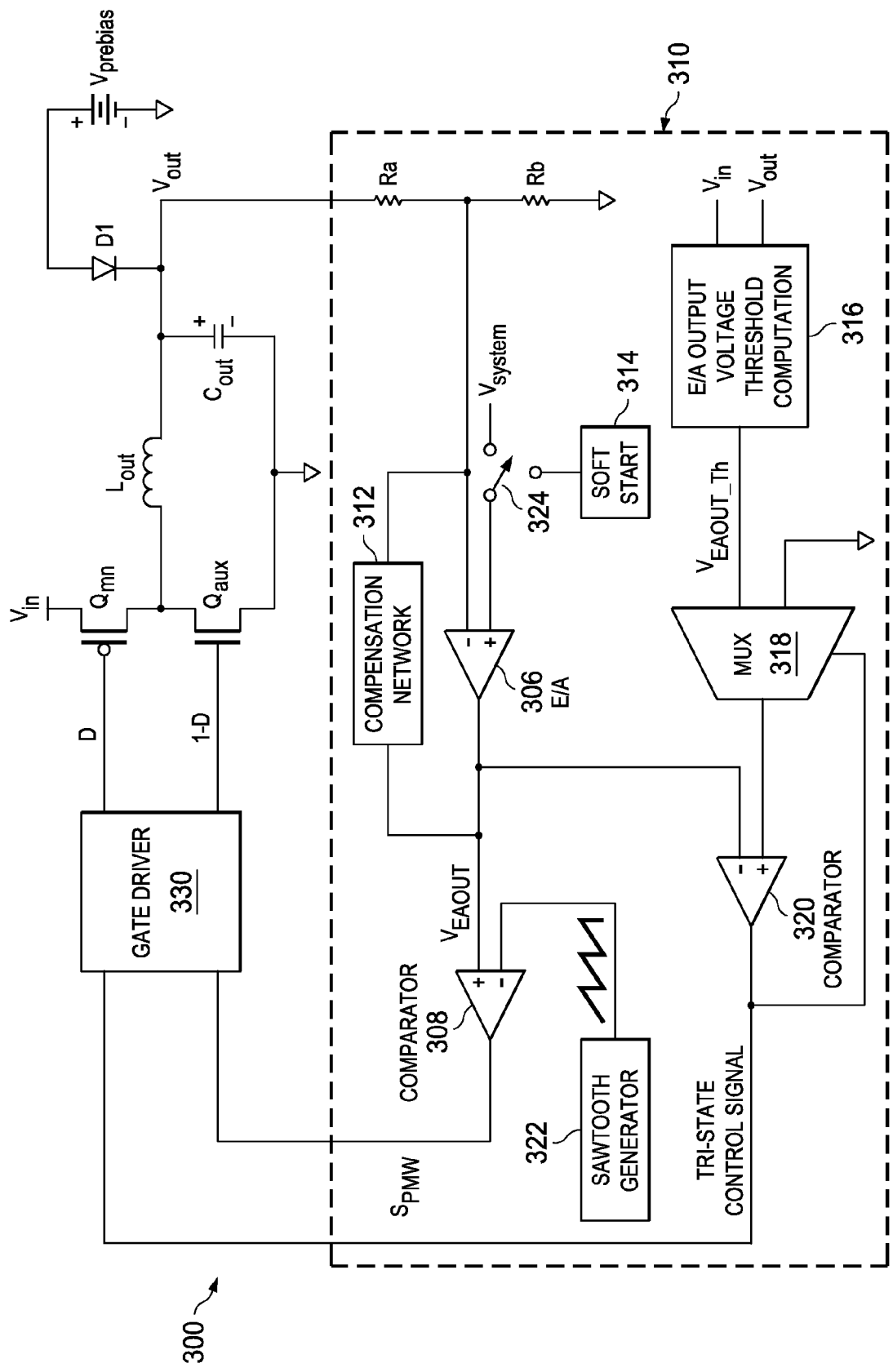
FIG. 3 illustrates a diagram of an embodiment of a power converter including a controller constructed according to the principles of the present invention.

Turning now to FIG. 3, illustrated is a diagram of an embodiment of a power converter 300 including a controller 310 and driver 330 constructed according to the principles of the present invention. The power converter in this exemplary embodiment includes a power train employing a buck topology similar to that illustrated and described with reference to FIG. 1. The power train includes a main switch (e.g., a PMOS switch) $Q_{mn}$, an auxiliary switch (e.g., a NMOS power switch) $Q_{aux}$, an output inductor $L_{out}$, a diode D1, and output capacitor $C_{out}$. It should be understood that a switch in the power converter may serve as a synchronous rectifier within the power converter. An output voltage $V_{out}$ is sensed and scaled with the voltage divider comprising resistors Ra, Rb. The scaled output voltage is coupled to the inverting input of error amplifier 306, which is coupled to compensation network 312. The noninverting input to error amplifier 306 is initially coupled by switch 324 to a soft-start ramp circuit 314, and then to a desired system voltage $V_{system}$, after the soft-start voltage ramp reaches the desired system voltage $V_{system}$. The output voltage $V_{EAOUT}$ of error amplifier 306 represents a controlled threshold voltage that is coupled to the noninverting input of a comparator 308. The inverting input of the comparator 308 is coupled to a sawtooth voltage waveform produced by a sawtooth generator 322. The comparator 308 produces a control signal $S_{PWM}$ that is coupled to the driver (e.g., a gate driver) 330. Under normal PWM operational conditions, the driver 330, in response to control signal $S_{PWM}$, produces duty cycle signal D for the control terminal of the main switch $Q_{mn}$, and the complementary duty cycle signal 1-D for the control terminal of the auxiliary switch $Q_{aux}$.

The driver 330 is also controlled by the "tri-state control signal" produced by a comparator 320 in conjunction with a multiplexer ("MUX") 318, which selects one of its two inputs and outputs the selected input. The tri-state control signal produced by the comparator 320 controls the operational mode of the driver 330. When the output of the comparator 320 is high, the tri-state control signal signals the driver 330 to disable the switching action of both the main switch $Q_{mn}$ and the auxiliary switch $Q_{aux}$. When the output of the comparator 320 is low, the tri-state control signal enables the driver 330 to generate a duty cycle signal D and the complementary duty cycle signal 1-D. An error amplifier threshold voltage $V_{EAOUT\_Th}$ is computed in a computation circuit 316, preferably using a computational process implementing equation 6 or equation 7, thereby providing a reliable method to produce monotonic turn-on of the power converter output voltage with a pre-charged output capacitor. Generation of the threshold voltage $V_{EAOUT\_Th}$ according to the equations should be well understood by those skilled in the art. A multiplexer 318 is used to create hysteresis in the error amplifier threshold voltage. Once the error amplifier output voltage exceeds the threshold voltage, the error amplifier threshold voltage is changed to 0 volts, which prevents re-disabling the switches by the tri-state control signal. This process of including hysteresis improves system immunity to noise.

Thus, a power converter including a controller responsive to a pre-charge voltage of an output capacitor, with readily attainable and quantifiable advantages, has been introduced. The power converter advantageously produces a monotonic turn-on of an output characteristic. In an exemplary embodiment, the power converter produces a monotonic rise in an output characteristic thereof, such as output voltage, at start-up. The power converter includes a switch, an error amplifier coupled to an output terminal of the power converter, and a comparator with an output terminal coupled to a control terminal of the switch. An input terminal of the comparator is coupled to an output terminal of the error amplifier to enable the switch to conduct for a duty cycle. At start-up, which includes restarts as well as resumption of power converter operation after an interruption, the switch is turned off until the error amplifier output voltage produces a duty cycle for the switch that corresponds to an output characteristic pre-charge condition, such as a pre-charge voltage of an output capacitor. A duty cycle is thereby produced for the switch that is adaptively controlled at start-up in response to an output characteristic pre-charge condition that advantageously produces a monotonic rise in the output characteristic of the power converter.

In an exemplary embodiment, the power converter is a pulse-width modulated power converter. In a further exemplary embodiment, the power converter operates in a continuous conduction mode. In an exemplary embodiment, another input terminal of the comparator is coupled to an oscillator. In an exemplary embodiment, the power converter is a buck power converter. In a further exemplary embodiment, the output characteristic of the power converter increases monotonically at start-up. In an exemplary embodiment, the output characteristic of the power converter is an output voltage of the power converter. In an exemplary embodiment, the voltage of the output terminal of the error amplifier provides a duty cycle for the power switch corresponding to a steady-state output characteristic for the output characteristic pre-charge condition.

Another exemplary embodiment of the invention provides a method of operating a power converter. In an exemplary embodiment, the method includes providing power to an output terminal of the power converter with a switch coupled to a reactive circuit element, producing a duty cycle for a switching period of the switch using a comparator coupled to a control terminal of the switch, and producing a threshold voltage for the comparator using an error amplifier with an input coupled to an output characteristic of the power converter. The method further includes disabling a duty cycle at power converter start-up until the threshold voltage produced by the error amplifier adaptively produces a duty cycle for the power switch corresponding to an output characteristic pre-charge condition.

In an exemplary embodiment, the power converter is a pulse-width modulated power converter. In a further exemplary embodiment, the method includes operating the power converter in a continuous conduction mode. In a further exemplary embodiment, the method includes coupling another input terminal of the comparator to an oscillator. In an exemplary embodiment, the power converter is a buck power converter. In a further exemplary embodiment, the output characteristic of the power converter increases monotonically at the start-up. In an exemplary embodiment, the output characteristic of the power converter is an output voltage of the power converter. In an exemplary embodiment, the voltage of the output terminal of the error amplifier provides a duty cycle for the switch corresponding to a steady-state output characteristic for the output characteristic pre-charge condition.

Those skilled in the art should understand that the previously described embodiments of a power converter and related methods of constructing the same are submitted for illustrative purposes only. In addition, other embodiments capable of producing a power converter employable with other switch-mode power converter topologies are well within the broad scope of the present invention. While the power converter has been described in the environment of a power converter producing an output characteristic to power a load, the power converter including the controller may also apply to other systems such as a power amplifier, a motor controller, and a system to control an actuator in accordance with a stepper motor or other electromechanical device.

For a better understanding of power converters, see "Modem DC-to-DC Switchmode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power converter, comprising:
   a switch;
   an error amplifier coupled to an output terminal of said power converter; and
   a comparator with an output terminal coupled to a control terminal of said switch and an input terminal coupled to an output terminal of said error amplifier configured to enable said switch to conduct for a duty cycle, wherein said switch is configured to be turned off at a start-up of said power converter until a voltage of said output terminal of said error amplifier crosses a threshold voltage dependent on an output characteristic pre-charge condition and an input voltage to said power converter.

2. The power converter as recited in claim 1 wherein said power converter is a pulse-width modulated power converter.

3. The power converter as recited in claim 1 wherein said power converter is configured to operate in a continuous conduction mode.

4. The power converter as recited in claim 1 wherein another input terminal of said comparator is coupled to a sawtooth generator.

5. The power converter as recited in claim 1 wherein said power converter is a buck power converter.

6. The power converter as recited in claim 1 wherein said output characteristic of said power converter is configured to be increased monotonically at said start-up.

7. The power converter as recited in claim 1 wherein said output characteristic of said power converter is an output voltage of said power converter.

8. The power converter as recited in claim 1 wherein said voltage of said output terminal of said error amplifier is configured to provide a duty cycle for said switch corresponding to a steady-state output characteristic for said output characteristic pre-charge condition.

9. The power converter as recited in claim 1 further comprising a soft start ramp circuit coupled to said input of said error amplifier.

10. The power converter as recited in claim 1 further comprising a computation circuit, multiplexer and another comparator configured to provide a signal to control an operation of a driver coupled to said switch.

11. A method of operating a power converter, comprising:
providing power to an output terminal of said power converter with a switch coupled to a reactive circuit element;
producing a duty cycle for a switching period of said switch using a comparator coupled to a control terminal of said switch;
producing a voltage for said comparator using an error amplifier with an input sensing an output characteristic of said power converter; and
disabling said duty cycle at a start-up of said power converter until said voltage produced by said error amplifier crosses a threshold voltage dependent on an output characteristic pre-charge condition and an input voltage to said power converter.

12. The method as recited in claim 11 wherein said power converter is a pulse-width modulated power converter.

13. The method as recited in claim 11 further comprising operating said power converter in a continuous conduction mode.

14. The method as recited in claim 11 further comprising coupling another input terminal of said comparator to a sawtooth generator.

15. The method as recited in claim 11 wherein said power converter is a buck power converter.

16. The method as recited in claim 11 wherein said output characteristic of said power converter increases monotonically at said start-up.

17. The method as recited in claim 11 wherein said output characteristic of said power converter is an output voltage of said power converter.

18. The method as recited in claim 11 wherein said voltage of said output terminal of said error amplifier provides a duty cycle for said power switch corresponding to a steady-state output characteristic for said output characteristic pre-charge condition.

19. The method as recited in claim 11 further comprising providing a soft start ramp circuit coupled to said input of said error amplifier.

20. The method as recited in claim 11 further comprising providing a signal to control an operation of a driver coupled to said switch.

* * * * *